(12) United States Patent
Kuriki

(10) Patent No.: US 10,518,599 B2
(45) Date of Patent: Dec. 31, 2019

(54) DAMPER AND DAMPER MANUFACTURING METHOD

(71) Applicant: HONDA MOTOR CO., LTD., Minato-Ku, Tokyo (JP)

(72) Inventor: Nobuharu Kuriki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 209 days.

(21) Appl. No.: 15/506,570

(22) PCT Filed: Mar. 26, 2015

(86) PCT No.: PCT/JP2015/059453
§ 371 (c)(1),
(2) Date: Feb. 24, 2017

(87) PCT Pub. No.: WO2016/031285
PCT Pub. Date: Mar. 3, 2016

(65) Prior Publication Data
US 2017/0253101 A1  Sep. 7, 2017

(30) Foreign Application Priority Data
Aug. 28, 2014  (JP) .................................. 2014-174104

(51) Int. Cl.
*H02K 7/18* (2006.01)
*B60G 15/10* (2006.01)
(Continued)

(52) U.S. Cl.
CPC .......... *B60G 17/0152* (2013.01); *F16F 9/512* (2013.01); *B60G 2202/24* (2013.01);
(Continued)

(58) Field of Classification Search
CPC ......... H02K 35/02; H02K 11/04; B60G 13/08
See application file for complete search history.

(56) References Cited

U.S. PATENT DOCUMENTS

2004/0150361 A1* 8/2004 Hio ...................... F16F 15/035
318/375
2005/0184612 A1* 8/2005 Cros ...................... H02K 23/30
310/158

(Continued)

FOREIGN PATENT DOCUMENTS

| JP | 60-160348 A | 8/1985 |
|---|---|---|
| JP | 04-244407 A | 9/1992 |
| JP | 2011-201474 A | 10/2011 |

OTHER PUBLICATIONS

PCT/ISA/210 from PCT/JP2015/059453 with the English translation thereof.

*Primary Examiner* — Bickey Dhakal
*Assistant Examiner* — Charles S Laughlin
(74) *Attorney, Agent, or Firm* — Carrier Blackman & Associates, P.C.; William D. Blackman; Joseph P. Carrier

(57) ABSTRACT

Provided is a damper with which the energy efficiency for attenuating input vibration corresponding to the unsprung resonance frequency and the sprung resonance frequency can be improved. Also provided is a method for manufacturing this damper. In this damper the electrical resonance frequency, as specified by the inductance of an electromagnetic motor and the capacitance of a capacitor, is set within ±20% of the unsprung resonance frequency, thereby enabling the input vibration corresponding to the sprung resonance frequency as well as the input vibration corresponding to the unsprung resonance frequency to be reduced.

4 Claims, 9 Drawing Sheets

(51) Int. Cl.
*B60G 17/015* (2006.01)
*F16F 9/512* (2006.01)
(52) U.S. Cl.
CPC .... *B60G 2202/312* (2013.01); *B60G 2300/60* (2013.01); *B60G 2500/02* (2013.01); *B60G 2500/10* (2013.01); *B60G 2600/1884* (2013.01); *F16F 2228/004* (2013.01); *F16F 2228/04* (2013.01)

(56) References Cited

U.S. PATENT DOCUMENTS

| | | | |
|---|---|---|---|
| 2013/0060422 A1* | 3/2013 | Ogawa | B60G 13/02 701/37 |
| 2014/0084091 A1* | 3/2014 | Schwelling | B02C 18/0007 241/28 |
| 2015/0047936 A1* | 2/2015 | Slusarczyk | F16F 9/512 188/313 |

* cited by examiner

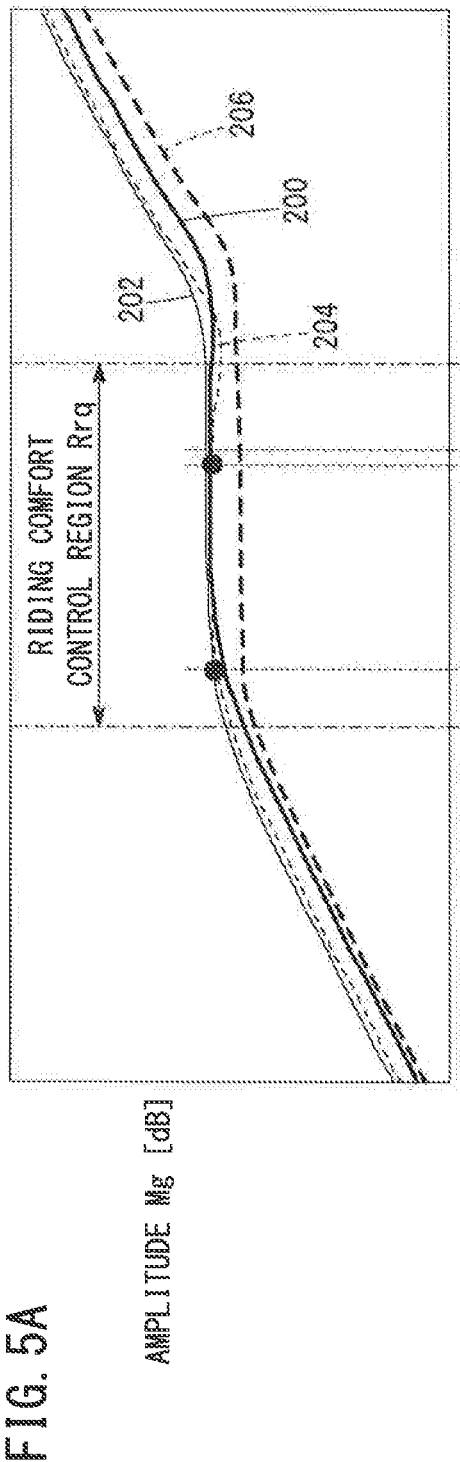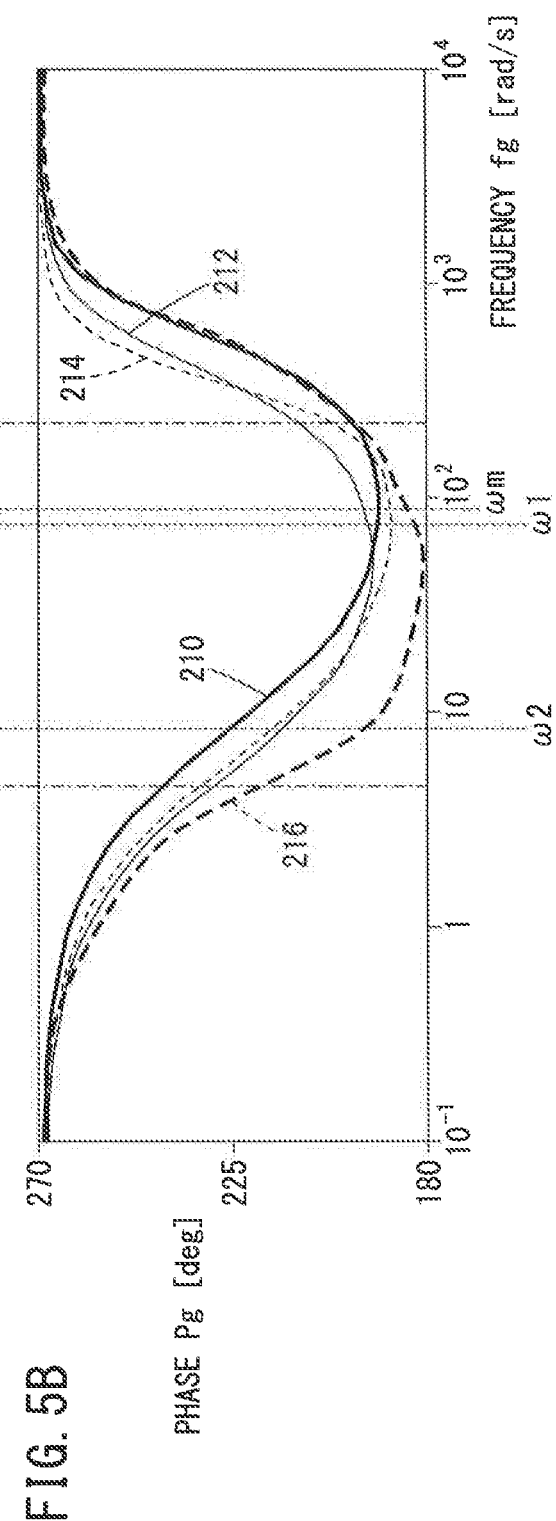

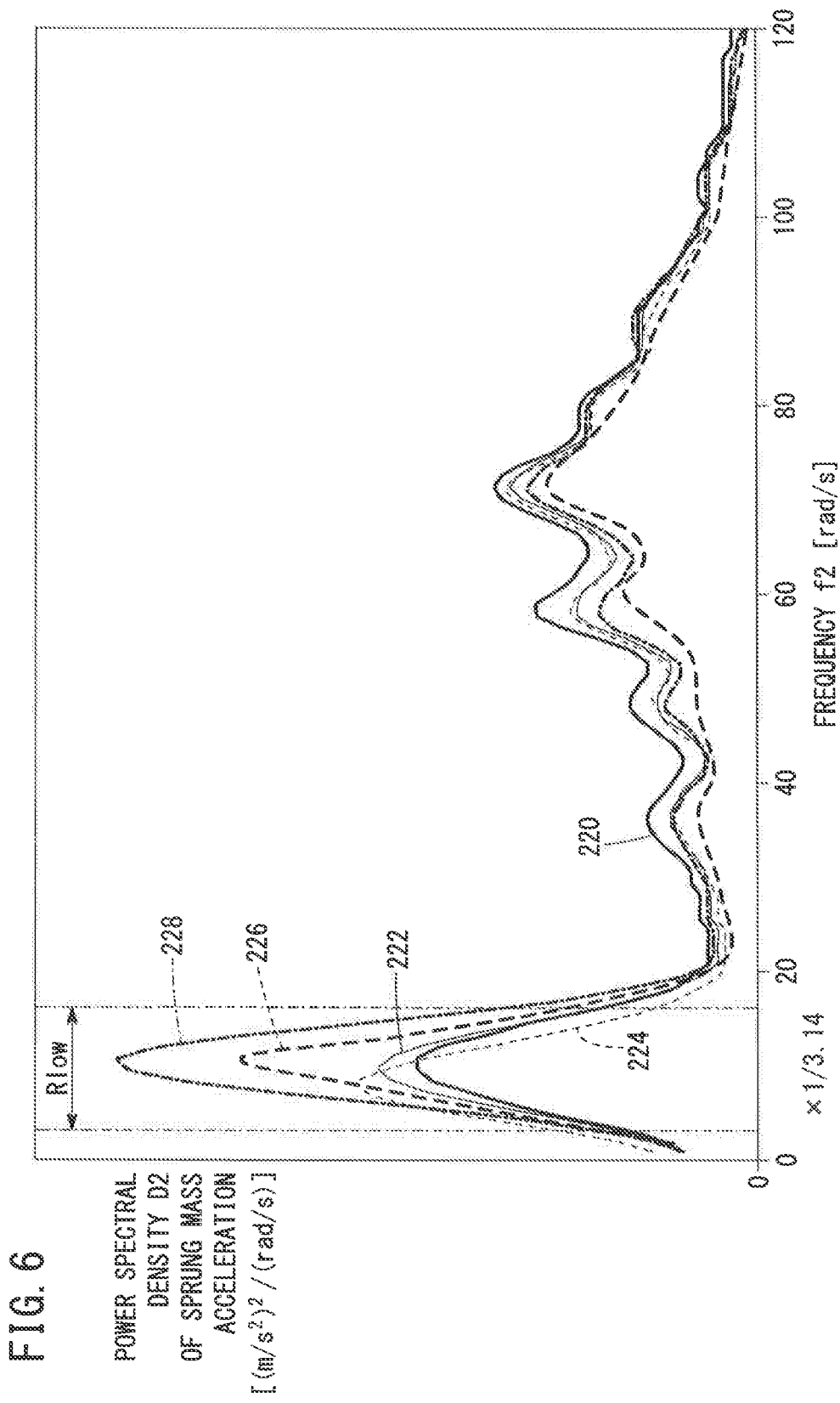

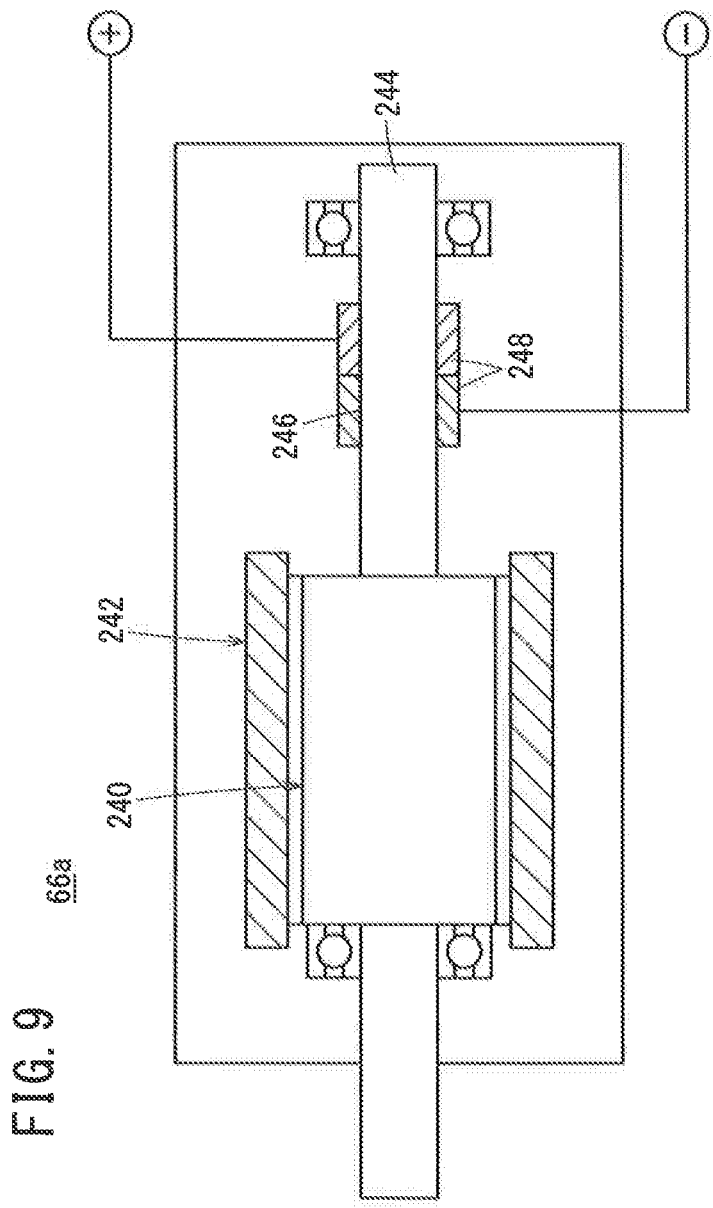

DAMPER AND DAMPER MANUFACTURING METHOD

TECHNICAL FIELD

The present invention relates to a damper that regenerates energy of input vibrations, as well as to a manufacturing method for such a damper.

BACKGROUND ART

U.S. Patent Application Publication No. 2004/0150361 (hereinafter referred to as "US 2004/0150361 A1") has the object of providing an electromagnetic suspension device for a vehicle in which, while an active control is carried out on a control-objective input force, input forces other than the control-objective force can be handled passively, and which enables not only simplification of the active control, but also improvement of energy efficiency (see paragraphs [0003] to [0005]).

In order to achieve this object, according to US 2004/0150361 A1, an electromagnetic suspension device for a vehicle (see abstract, FIG. 3) is equipped with an electromagnetic actuator 4, which is interposed in parallel with a spring element 7 between a sprung mass and an unsprung mass, and is driven by an electric motor 8. A motor controller 17 is configured to calculate a displacement input to the electromagnetic actuator 4, and to control the electric motor 8 so as to produce an optimal damping force responsive to the displacement input. An electrical damping element (an electric resistor 20 or an electric resonance circuit 21), which passively generates a damping force by dynamic braking of the electric motor 8 with respect to a displacement input from the unsprung mass, is connected in parallel with the electric motor 8 to a control circuit for the electric motor 8 (see abstract, FIG. 4, and FIG. 7).

Among such electrical damping elements, the electric resonance circuit 21 (FIG. 7) exhibits a resonance frequency, which is coincident with the resonance frequency of the unsprung mass (for example, 10 to 20 Hz), and includes a resistor R, a coil L, and a capacitor C (see paragraph [0049]). Consequently, it is possible to achieve both an effective active control with respect to the control-objective input force within a low frequency region including the sprung mass resonance frequency, and an effective passive control with respect to the control-objective input force in the vicinity of the unsprung mass resonance frequency (see paragraph [0065], FIG. 9). The active control is a current control for the electric motor 8, which is implemented with the object of providing a low frequency vibration control including an attitude control for the vehicle (see paragraph [0041]).

SUMMARY OF INVENTION

As described above, according to US 2004/0150361 A1, in accordance with the active control using the current control of the electric motor 8, the control-objective input force in a low frequency region including the sprung mass resonance frequency is handled. Further, in accordance with the passive control using the electric resonance circuit 21 made up from a combination of the resistor R, the coil L, and the capacitor C, the control-objective input force in the vicinity of the unsprung mass resonance frequency is handled.

Since the active control is a current control for the electric motor 8 with the object of providing a low frequency vibration control including an attitude control (see paragraph [0041]), when input vibrations that correspond to the sprung mass resonance frequency are damped, energy is consumed by the electric motor 8. Therefore, in US 2004/0150361 A1, there is still room for improvement from the standpoint of energy efficiency in attenuation of input vibrations corresponding to the unsprung mass resonance frequency and the sprung mass resonance frequency.

The present invention has been devised in consideration of the foregoing problem, and has the object of providing a damper and a manufacturing method for a damper, in which it is possible to improve energy efficiency in attenuation of input vibrations corresponding to an unsprung mass resonance frequency and a sprung mass resonance frequency.

A damper according to the present invention is equipped with a damper main body arranged in parallel with a spring, an electromagnetic motor configured to generate a damping force with respect to the spring by regenerating energy from an input vibration input to the damper main body, and a capacitor connected electrically with the electromagnetic motor, wherein an electric resonance frequency, which is specified by an inductance of the electromagnetic motor and a capacitance of the capacitor, is set within ±20% from an unsprung mass resonance frequency, so that, in addition to a component of the input vibration corresponding to the unsprung mass resonance frequency, a component of the input vibration corresponding to a sprung mass resonance frequency is passively suppressed.

According to the present invention, the electric resonance frequency, which is specified by the inductance of the electromagnetic motor and the capacitance of the capacitor, is set within ±20% of the unsprung mass resonance frequency. In accordance with this feature, in addition to a component of the input vibration corresponding to the unsprung mass resonance frequency, a component of the input vibration corresponding to the sprung mass resonance frequency is passively suppressed. Consequently, without actively controlling the electromagnetic motor, it is possible to suppress components of input vibrations that correspond respectively to the unsprung mass resonance frequency and the sprung mass resonance frequency.

More specifically, the inventor of the present invention has discovered that, if the electric resonance frequency is set to the unsprung mass resonance frequency or a value in the vicinity thereof (for example, within ±20% of the unsprung mass resonance frequency), in the force that is generated in the damper main body, which functions as an actuator, an effect (hereinafter referred to as a "negative spring effect") appears conspicuously in which components of input vibrations corresponding to the sprung mass resonance frequency are reduced. Therefore, in contradistinction to the invention disclosed in US 2004/0150361 A1, components of input vibrations corresponding respectively to the unsprung mass resonance frequency and the sprung mass resonance frequency can be suppressed, even without an active control by the electromagnetic motor being performed in relation to input vibrations corresponding to the sprung mass resonance frequency. Consequently, it is possible to improve energy utilization efficiency without consuming electric power in order to suppress components of input vibrations that correspond to the sprung mass resonance frequency, but rather by storing electric power by regeneration of energy from the input vibrations. The term "negative spring effect" is associated with an action opposite to that of the spring. The theoretical basis for the negative spring effect will be described later.

The electric resonance frequency may be set to a value that is equal to the unsprung mass resonance frequency. In accordance with this feature, the negative spring effect can be used extremely effectively.

The electromagnetic motor, for example, can be a DC motor or a commutator type single phase AC motor. In the case that a commutator type signal phase AC motor is used as the electromagnetic motor, the moment of inertia can be reduced significantly in comparison with a general type of DC motor having an iron core in the rotor. Consequently, if the damper according to the present invention is used, for example, in a suspension device for a vehicle, it is possible to prevent worsening of comfort during riding when high frequency road surface vibrations occur.

A manufacturing method for a damper, in which the damper is equipped with a damper main body arranged in parallel with a spring, an electromagnetic motor configured to generate a damping force with respect to the spring by regenerating energy from an input vibration input to the damper main body, and a capacitor connected electrically with the electromagnetic motor, is characterized by a step of selecting a capacitance of the capacitor so that an electric resonance frequency, which is specified by an inductance of the electromagnetic motor and the capacitance of the capacitor, lies within ±20% from an unsprung mass resonance frequency, so as to passively suppress a component of the input vibration corresponding to a sprung mass resonance frequency, in addition to a component of the input vibration corresponding to the unsprung mass resonance frequency.

BRIEF DESCRIPTION OF DRAWINGS

FIG. 5A is a diagram showing an example of a relationship between frequency and amplitude in relation to a transfer function, for each of electric resonance frequencies specified from the inductance of an electromagnetic motor and the capacitance of a capacitor, and FIG. 5B is a diagram showing an example of a relationship between frequency and phase in relation to the transfer function, for each of the electric resonance frequencies;

FIG. 6 is a diagram showing an example of a relationship between frequency and power spectral density concerning a sprung mass acceleration, for each of the electric resonance frequencies;

FIG. 9 is a cross-sectional view showing in simplified form a configuration of an electromagnetic motor according to a modification.

DESCRIPTION OF EMBODIMENTS

A. Embodiment

[A1. Configuration of Vehicle 10]
(A1-1. Overall Configuration of Vehicle 10

Figure 1:
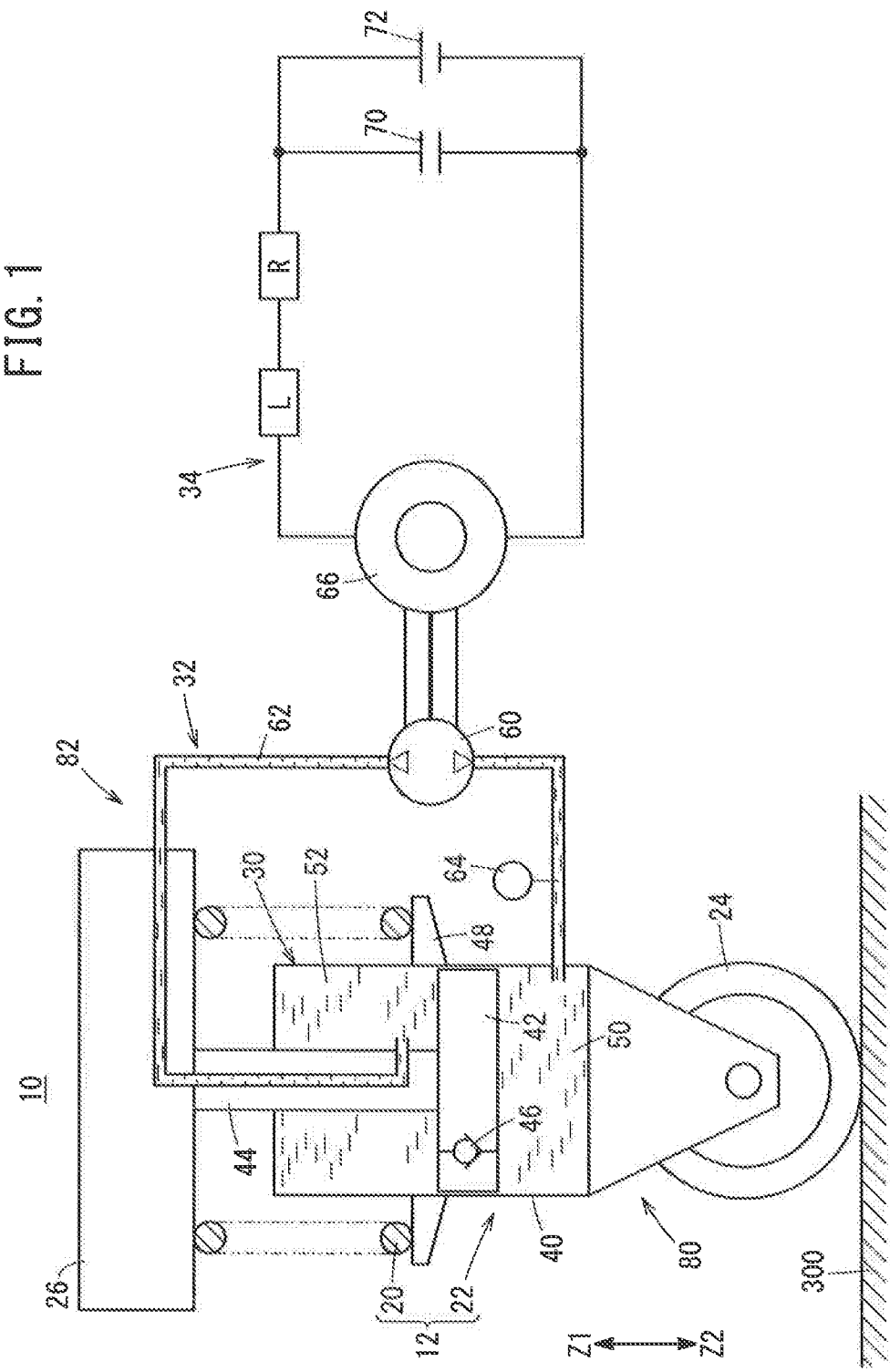
FIG. 1 is a schematic configuration diagram showing in simplified form portions of a vehicle that incorporates therein a suspension device having a damper according to an embodiment of the present invention.

FIG. 1 is a schematic configuration diagram showing in simplified form portions of a vehicle 10 incorporating therein a suspension device 12 having a damper 22 according to an embodiment of the present invention. The suspension device 12 includes a coil spring 20 and the damper 22 corresponding to each of wheels 24 of the vehicle 10.

(A1-2. Coil Spring 20)

The coil spring 20 is disposed between a vehicle body 26 and a spring seat 48, and absorbs vibrations (road surface vibrations) that are input from a road surface 300 to the wheel 24.

(A1-3. Damper 22)

(A1-3-1. Overall Configuration of Damper 22)

The damper 22 serves to dampen or attenuate the displacement of the coil spring 20 (or the vehicle body 26). As shown in FIG. 1, the damper 22 is equipped with a damper main body 30, a hydraulic mechanism 32, and a motor circuit 34.

(A1-3-2. Damper Main Body 30)

The damper main body 30, in addition to the spring seat 48, further comprises a hydraulic cylinder 40, a piston head 42, a piston rod 44, and a piston valve 46. The hydraulic cylinder 40 is a cylindrical member, and the interior of the hydraulic cylinder 40 is partitioned into a first hydraulic chamber 50 and a second hydraulic chamber 52 by the piston head 42. The first hydraulic chamber 50 and the second hydraulic chamber 52 are filled with oil. The piston head 42, which has a diameter substantially equivalent to that of the inner peripheral surface of the hydraulic cylinder 40, is fixed to one end of the piston rod 44, and the other end of the piston rod 44 is fixed to the vehicle body 26. The piston valve 46 is formed in the interior of the piston head 42, and allows communication between the first hydraulic chamber 50 and the second hydraulic chamber 52. The spring seat 48 is formed on the outer periphery of the hydraulic cylinder 40 and supports one end of the coil spring 20. In accordance with the above-described structure, the damper main body 30 functions as an actuator.

(A1-3-3. Hydraulic Mechanism 32)

The hydraulic mechanism 32 serves to control the flow of oil in the damper 22, and comprises a hydraulic pump 60, an oil flow passage 62, an accumulator 64, and an electromagnetic motor 66 (hereinafter also referred to as a "motor 66"). The motor 66 generates a damping force Fd with respect to the coil spring 20 by regenerating energy from input vibrations that are input to the damper main body 30. Although the motor 66 of the present embodiment is a direct current (DC) type of motor, it may be an alternating current (AC) type of motor.

(A1-3-4. Motor Circuit 34)

The motor circuit 34 is a circuit that is connected electrically to the motor 66, and is equipped with a capacitor 70 (first power storage device), and a battery 72 (second power storage device, electrical load). With the motor circuit 34 illustrated in FIG. 1, an inductance L of the motor 66 is shown in combination with a resistance R of the motor 66. By combining the motor 66 and the motor circuit 34, it becomes possible for a motor reaction force Fmr (stated otherwise, a damping force Fd with respect to the coil spring 20) to be generated by a counter electromotive force of the motor 66. In addition, generation of electricity can be carried out in accordance with power regeneration from the motor 66.

The capacitor 70 is charged with regenerated power of the electromagnetic motor 66, and supplies the charged power with respect to the battery 72, or to other non-illustrated electrical devices (for example, audio equipment, a navigation device, or a display device of an instrument panel). The capacitor 70 of the present embodiment is a polar capacitor. The battery 72 is charged with the regenerated power of the electromagnetic motor 66 or the discharge power of the capacitor 70, and supplies the charged power with respect to the other electrical devices.

Since the configuration of the motor circuit 34 is simple, operations thereof are highly reliable.

[A2. Operations of the Damper 22]

Figure 2:
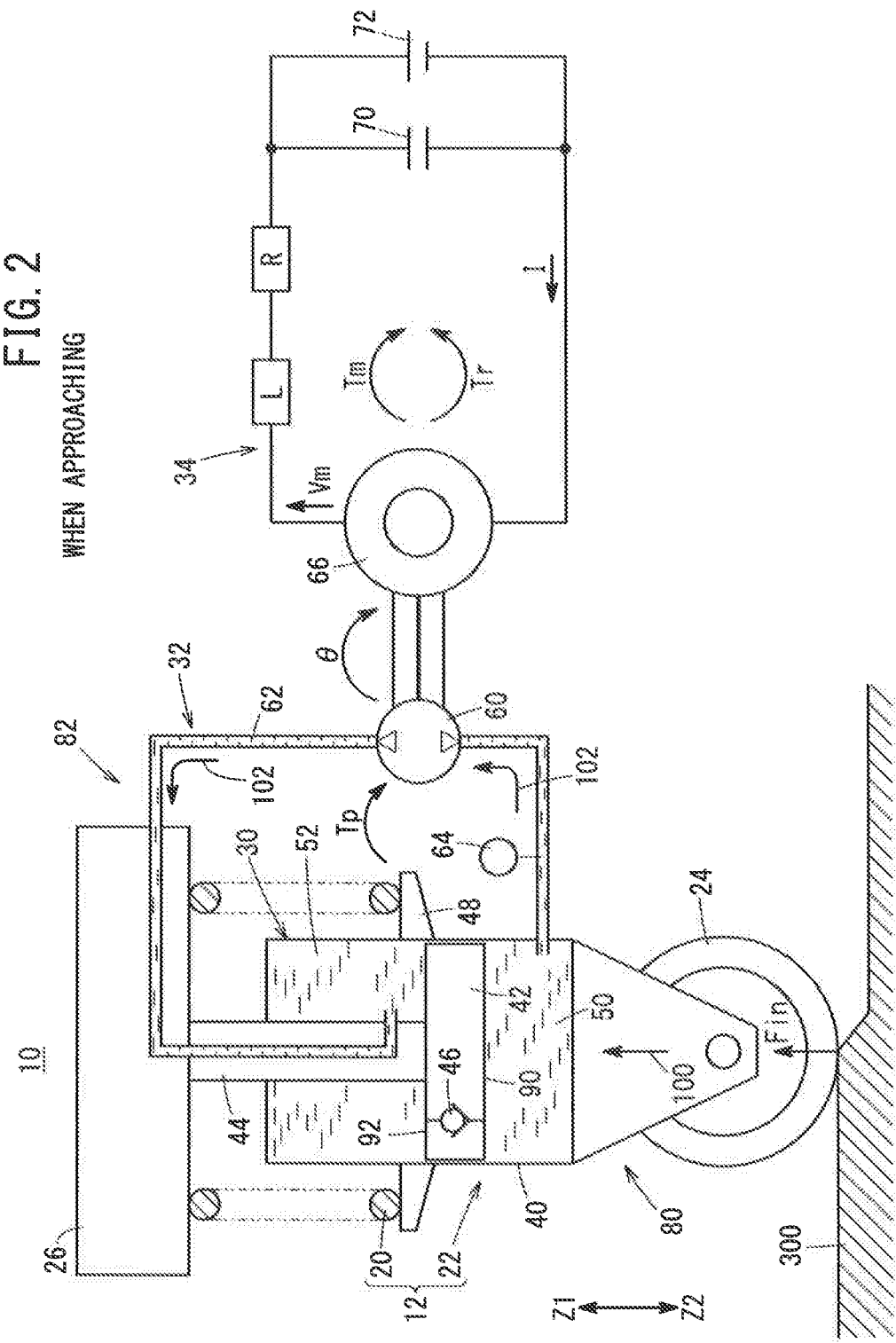
FIG. 2 is a view showing a state where an unsprung member and a sprung member approach one another in the aforementioned embodiment.
Figure 3:
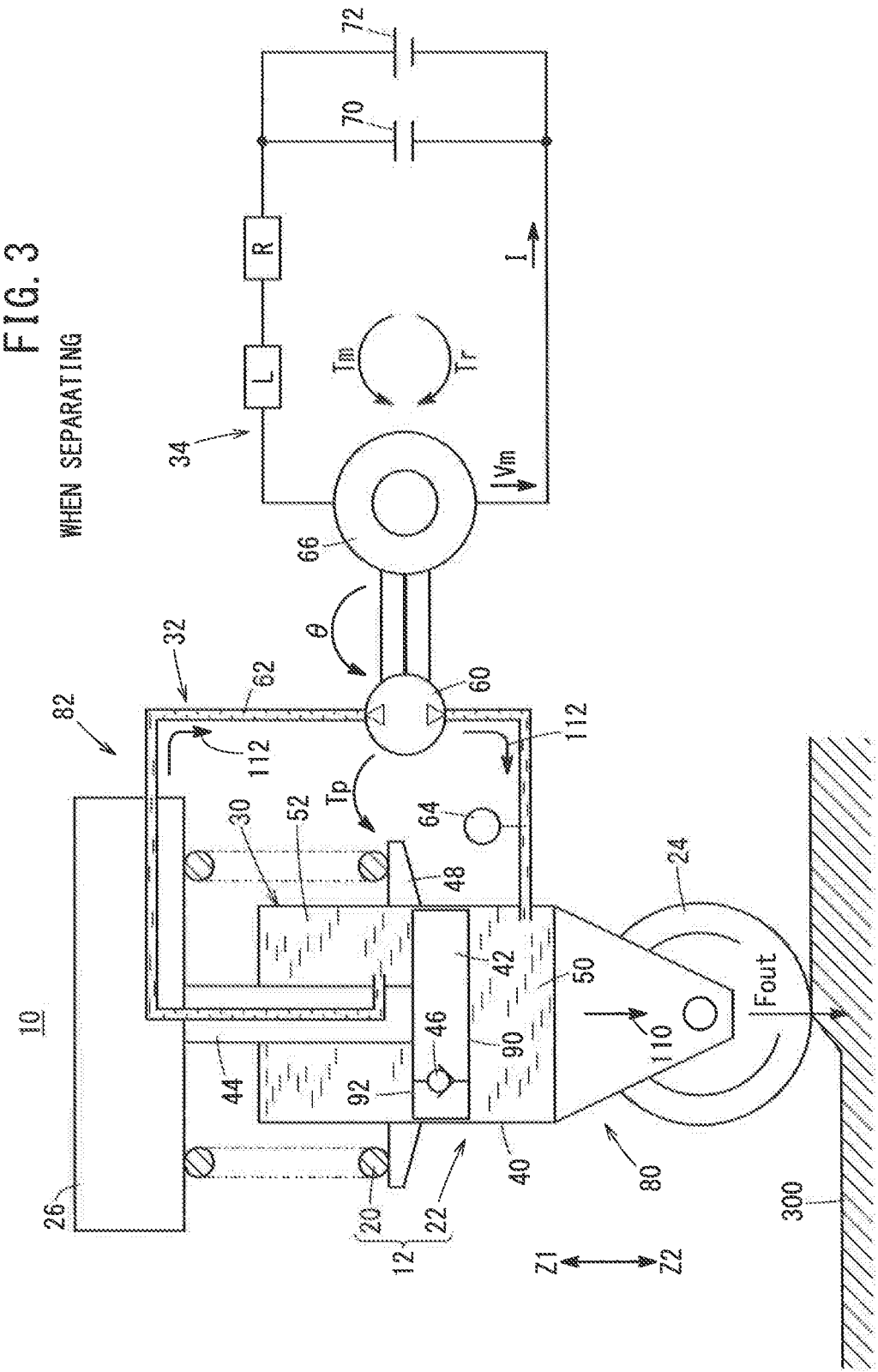
FIG. 3 is a view showing a state where the unsprung member and the sprung member separate away from one another in the aforementioned embodiment.

FIG. 2 is a view showing a state where an unsprung member 80 and a sprung member 82 approach one another in the present embodiment. FIG. 3 is a view showing a state where the unsprung member 80 and the sprung member 82 separate away from one another in the present embodiment.

As shown in FIG. 2, when there is a road surface input Fin from the road surface 300, along therewith, an unsprung member 80 (the wheels 24, the hydraulic cylinder 40, etc.) approaches toward a sprung member 82 (the vehicle body 26, the piston head 42, the piston rod 44, etc.) (refer to the arrow 100). At this time, the pressure applied to the piston head 42 mainly acts on a lower surface 90 thereof. Owing thereto, the oil in the interior of the hydraulic mechanism 32 (an oil flow passage 62, etc.) flows in the direction shown by the arrow 102.

Along therewith, a torque Tp is generated in a rotary shaft of the hydraulic pump 60. The rotary shaft of the hydraulic pump 60 is connected to a rotary shaft of the electromagnetic motor 66 (as noted in simplified form in FIGS. 1 to 3). Therefore, a torque Tp (output torque) output from the rotary shaft of the hydraulic pump 60 is input to the rotary shaft of the motor 66. Hereinafter, a torque (input torque) that is generated in the motor 66 will be referred to as a torque Tm or an input torque Tm.

When the motor 66 rotates accompanying the input torque Tm to the motor 66, the motor 66 generates power (stated otherwise, performs energy regeneration of the input vibrations) corresponding to the input torque Tm. Consequently, a voltage Vm is generated and a current I flows in the motor circuit 34. When the motor 66 generates power corresponding to the input torque Tm, a counter electromotive force is generated, and a reaction force Tr is generated in the rotary shaft of the motor 66. When the reaction force Tr is generated in the rotary shaft of the hydraulic pump 60, the reaction force Tr acts as a counterforce with respect to the force that acts on the oil (refer to the arrow 102) accompanying the road surface input Fin from the road surface. Along therewith, the damping force Fd with respect to the coil spring 20 is generated in the unsprung member 80 (the wheel 24, the hydraulic cylinder 40, etc.). Consequently, it is possible for the vibrations of the coil spring 20 to be suppressed.

On the other hand, as shown in FIG. 3, when there is a road surface input Fout from the road surface 300, along therewith, the unsprung member 80 (the wheels 24, the hydraulic cylinder 40, etc.) separate away from the sprung member 82 (the vehicle body 26, the piston head 42, the piston rod 44, etc.) (refer to the arrow 110). At this time, the pressure applied to the piston head 42 mainly acts on an upper surface 92 thereof. Owing thereto, the oil in the interior of the hydraulic mechanism 32 (the oil flow passage 62, etc.) flows in the direction shown by the arrow 112. Along therewith, the pump 60 and the motor 66 operate in an opposite manner to the case of FIG. 2. Accordingly, the directions of the voltage Vm and the current I of the motor 66 are opposite to those shown in FIG. 2.

[A3. Damping Characteristics of Damper 22]

Next, a description will be given concerning the damping characteristics of the damper 22 in the present embodiment. According to the characteristics of the present embodiment, an electric resonance frequency ωm is set taking into consideration the negative spring effect. Further, the damper 22 (hydraulic mechanism 32) comprises a configuration to enable use of the polar capacitor 70. The electric resonance frequency ωm (hereinafter also referred to as a "resonance frequency ωm") is a value specified from the inductance L of the motor 66 and the capacitance C of the capacitor 70. More specifically, the electric resonance frequency ωm is defined by the expression $1/\{2\sqrt{(L \cdot C)}\}$. The respective characteristics discussed above will be described in detail below.

(A3-1. Definitions)

Figure 4:
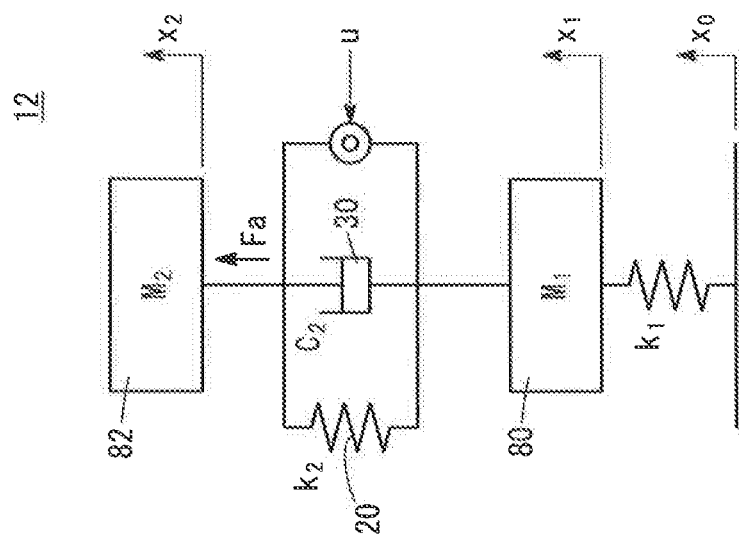
FIG. 4 is a view showing an equivalent model for explaining operations of the suspension device of the aforementioned embodiment.

FIG. 4 is a view showing an equivalent model for explaining operations of the suspension device 12 of the present embodiment. The various values shown in FIG. 4 are as follows:

$x_0$: vertical displacement amount of road surface 300 [m]

$x_1$: vertical displacement amount of unsprung member 80 [m]

$x_2$: vertical displacement amount of sprung member 82 [m]

$M_1$: mass of unsprung member 80 [kg]

$M_2$: mass of sprung member 82 [kg]

$k_1$: spring constant of unsprung member 80 [N/m]

$k_2$: spring constant of coil spring 20 [N/m]

$C_2$: damping coefficient of damper main body 30 [N/m/s]

u: control amount of electromagnetic motor 66

As the unsprung member 80, there may be included, for example, the wheel 24 and the hydraulic cylinder 40. As the sprung member 82, there may be included, for example, the vehicle body 26, the piston head 42, and the piston rod 44. Moreover, in the present embodiment, the control amount u of the motor 66 can be represented, for example, by a regenerative energy.

(A3-2. Force Fa (Negative Spring Effect) Generated by Damper Main Body 30 (Actuator))

(A3-2-1. Theoretical Description)

Next, the negative spring effect will be described while referring to the force Fa generated by the damper main body 30 (actuator).

In the damper 22 of the present embodiment, the following relationships are satisfied:

$$Fa = \lambda \cdot Tp \quad (1)$$

$$\lambda = \theta/(x_2 - x_1) \quad (2)$$

$$Imp \cdot \theta'' = Tm - Tp \quad (3)$$

$$L \cdot I'' + R \cdot I' + I/C + Vm' = 0 \quad (4)$$

$$Tm = Ke \cdot I \quad (5)$$

$$Vm = Ke \cdot \theta' \quad (6)$$

The contents of the various numerical values in equations (1) through (6) are as follows:

C: capacitance of capacitor 70 [F]
Fa: force generated in damper main body 30 (actuator) [N]
I: current flowing in motor circuit 34 [A]
I': speed of current flowing in motor circuit 34 [A/s]
I'': acceleration of current flowing in motor circuit 34 [A/s/s]
Imp: moment of inertia of hydraulic pump 60 and motor 66 [kg·m$^2$]
Ke: induced voltage constant of motor 66 (=torque constant of motor 66)
L: reactance of motor 66 [Ω]
R: resistance of motor 66 [Ω]
Tm: torque of motor 66 [N·m]
Tp: torque of hydraulic pump 60 [N·m]
Vm: output voltage of motor 66 (motor voltage) [V]
Vm': time differential value of motor voltage Vm [V]
$x_1$: vertical displacement amount of unsprung member 80 [m]
$x_2$: vertical displacement amount of sprung member 82 [m]
λ: equivalent gear ratio [–]
θ: angle of rotation of rotary shaft of motor 66 [deg]
θ': rotational velocity of rotary shaft of motor 66 [deg/s]
θ'': rotational acceleration of rotary shaft of motor 66 [deg/s/s]

When Laplace transformations are carried out in relation to the equations (1) through (6), the force Fa generated in the damper main body 30 (actuator) can be expressed by the following equation (7).

$$Fa = -\lambda^2 \cdot \text{Im} \; p(x_2'' - x_1'') - \frac{\lambda^2 \cdot Ke^2 \cdot s}{L \cdot s^2 + R \cdot s + (1/C)}(x_2' - x_1') \quad (7)$$

The first term "$-\lambda^2 \cdot \text{Imp}(x_2''-x_1'')$" on the right-hand side of equation (7) is indicative of the negative spring effect. More specifically, since the unsprung member 80 advances and retracts repeatedly in the vertical direction with respect to the sprung member 82, the positional relationship between the unsprung member 80 and the sprung member 82 can be approximated by a trigonometric function. Therefore, the expression "$\lambda^2 \cdot \text{Imp}(x_2''-x_1'')$" can be regarded as being equivalent to the expression "$K(x_2-x_1)$" (where K represents a spring constant). Further, the first term on the right-hand side of equation (7) includes a negative sign "–". Therefore, the first term on the right-hand side of equation (7) implies a force in a direction opposite to that of the coil spring 20. As a result, the first term on the right-hand side of equation (7) exhibits an effect of suppressing vibrations of a sprung mass resonance frequency ω2 or vibrations in the vicinity thereof.

The second term "$-\lambda^2 \cdot Ke^2 \cdot s/\{L\cdot s^2+R\cdot s+(1/C)\}\cdot(x_2'-x_1')$" on the right-hand side of equation (7) is indicative of the damping force by the damper main body 30 (actuator).

If equation (7) is expressed by the transfer function $Fa/(x_2'-x_1')$, the following equation (8) is obtained.

$$\frac{Fa}{(x_2' - x_1')} = -\lambda^2 \cdot \text{Im} \; p \cdot s \left[ \frac{L \cdot s^2 + R \cdot s + \{(1/C) + Ke^2/(\text{Im} \; p)\}}{L \cdot s^2 + R \cdot s + (1/C)} \right] \quad (8)$$

As discussed above, the force Fa generated in the damper main body 30 (actuator) produces a negative spring effect in relation to the sprung mass resonance frequency ω2t or frequencies in the vicinity thereof. Therefore, if the electric resonance frequency ωm of the motor 66 and the motor circuit 34 is set while taking an unsprung mass resonance frequency ω1 as a reference, it is possible to effectively exhibit a vibration damping effect in regard to both of the sprung mass and the unsprung mass.

(A3-2-2. Example of Transfer Function G)

Based on the above-described negative spring effect, an example in which the electric resonance frequency ωm of the motor 66 and the motor circuit 34 is set based on the unsprung mass resonance frequency ω1 will be described, in comparison with a comparative example.

FIG. 5A shows an example of a relationship between frequency fg and amplitude Mg in relation to a transfer function G, for each of electric resonance frequencies ωm specified from the inductance L of the motor 66 and the capacitance C of the capacitor 70. FIG. 5B shows an example of a relationship between frequency fg and phase Pg in relation to the transfer function G, for each of the electric resonance frequencies ωm. By combining FIG. 5A and FIG. 5B, a Bode diagram is constructed, which indicates the frequency characteristics of the damper 22 according to the present embodiment.

In FIGS. 5A and 5B, curves 200 and 210 show a first example, in which the resonance frequency ωm is a frequency (81.6 [rad/s] according to the present embodiment) that is roughly 6.5% greater than the unsprung mass resonance frequency ω1 (76.6 [rad/s] according to the present embodiment). Curves 202 and 212 show a second example, in which the resonance frequency ωm is equal to the unsprung mass resonance frequency ω1. Curves 204 and 214 show a third example, in which the resonance frequency ωm is a frequency (63.2 [rad/s] according to the present embodiment) that is roughly 17.5% less than the unsprung mass resonance frequency ω1. Curves 206 and 216 show a comparative example, in which the resonance frequency ωm is a frequency (53.6 [rad/s] according to the present embodiment) that is roughly 30.0% less than the unsprung mass resonance frequency ω1.

As shown in FIGS. 5A and 5B, within a frequency region Rrq (hereinafter also referred to as a "riding comfort control region Rrq"), which influences the riding comfort of occupants in the vehicle 10, concerning any of the first example, the second example, the third example, and the comparative example, although the amplitude Mg does not change significantly, the phase Pg thereof changes.

(A3-2-3. Example of Sprung Mass Characteristics)

FIG. 6 is a diagram showing an example of a relationship between frequency f2 and power spectral density D2 concerning a sprung mass acceleration $x_2''$, for each of the electric resonance frequencies ωm. It should be noted that, in order to facilitate understanding in units of Hz, concerning the numerical values of the frequencies f2 shown on the horizontal axis of FIG. 6, the actual numerical values thereof are multiplied by "1/3.14" (the same also applies to FIG. 7). In FIG. 6, the curves 220, 222, 224, 226, and 228 indicate first through third examples together with first and second comparative examples, respectively. The first through third examples of FIG. 6 correspond to the first through third examples of FIGS. 5A and 5B. The first comparative example of FIG. 6 corresponds to the comparative example of FIGS. 5A and 5B. The second comparative example of FIG. 6 is indicative of a situation in which an active control is carried out unaccompanied by an LC resonance.

In general, occupants of the vehicle 10 are sensitive to vibrations in a relatively low frequency region (for example, 3 to 8 Hz). As can be understood from FIG. 6, within a region Rlow of a comparatively low frequency, the power spectral density D2 tends to decrease as the resonance frequency ωm approaches toward the unsprung mass resonance frequency ω1. Such a feature implies that, as the resonance frequency ωm approaches toward the unsprung mass resonance frequency ω1, the vibration damping effect on the sprung mass tends to increase.

(A3-2-4. Example of Unsprung Mass Characteristics)

Figure 7:
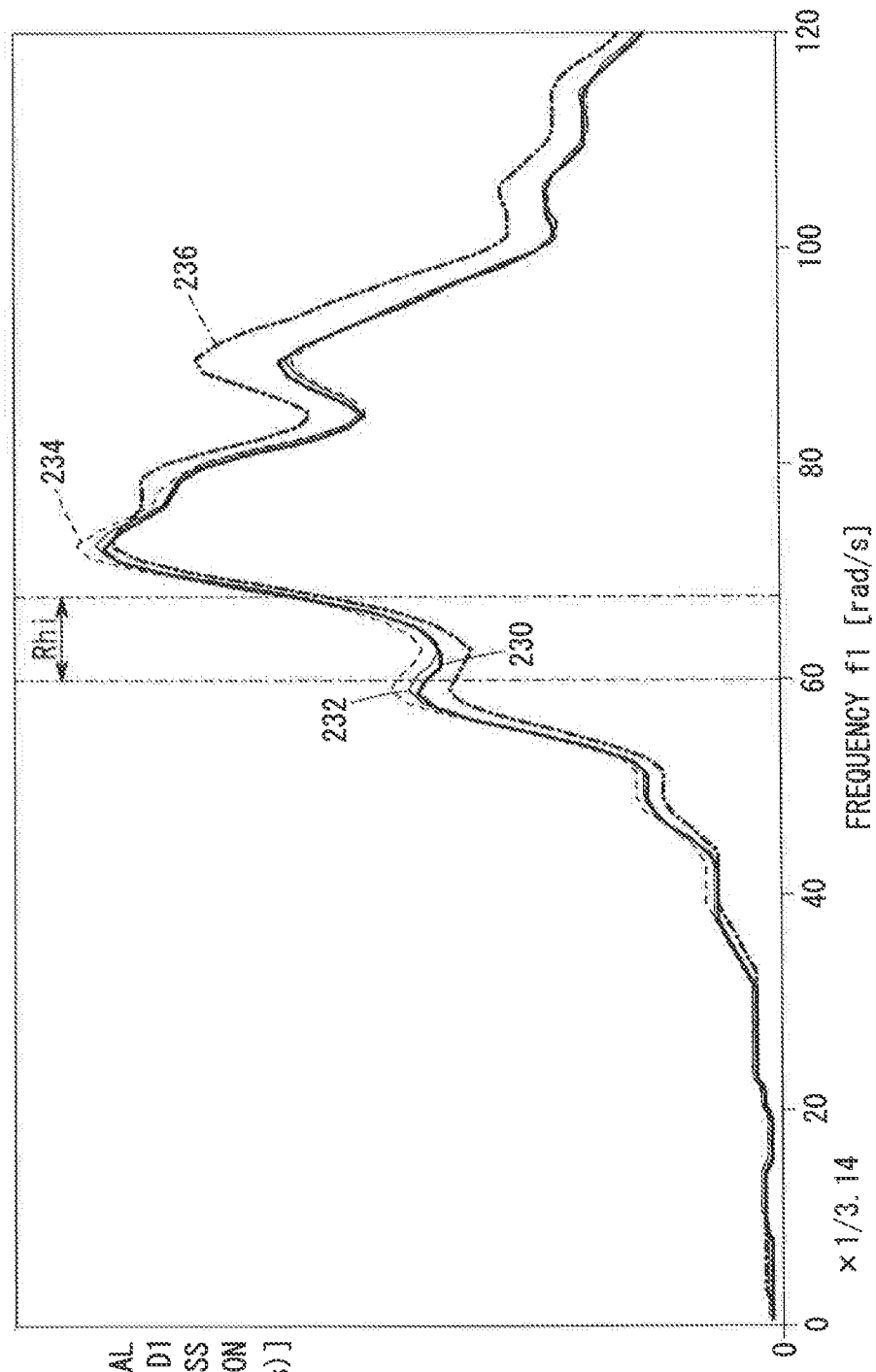
FIG. 7 is a diagram showing an example of a relationship between frequency and power spectral density concerning an unsprung mass acceleration, for each of the electric resonance frequencies.

FIG. 7 is a diagram showing an example of a relationship between frequency ω1 and power spectral density D1 concerning an unsprung mass acceleration $x_1"$, for each of the electric resonance frequencies ωm. In FIG. 7, as in FIG. 6, the curves 230, 232, 234, and 236 indicate first and second examples together with first and second comparative examples (third example is omitted). The first and second examples and the first and second comparative examples of FIG. 7 correspond respectively to the first and second examples and the first and second comparative examples of FIG. 6.

In general, the unsprung mass acceleration $x_1"$ has an influence on the steering stability of the vehicle 10. As can be understood from FIG. 7, in a comparatively high frequency region Rhi, the power spectral densities D1 are substantially equivalent. Therefore, the same steering stability can be realized for any of the examples.

(A3-3. Configuration to Enable Use of Polar Capacitor 70)
(A3-3-1. Assumptions)

As a prerequisite for generating the negative spring effect in the manner described above, it is necessary to generate an LC resonance in the motor circuit 34 by forward rotation or reverse rotation of the motor 66 in accordance with vertical movements accompanying the road surface inputs Fin, Fout (see FIGS. 2 and 3). In the case that the motor circuit 34 is subjected to LC resonance, the output voltage Vm of the motor 66 switches continuously between a positive value and a negative value. In this instance, if the capacitor 70 is of a polar type, there is a concern that durability of the capacitor 70 may be impaired.

As a countermeasure against this concern, it may be considered to make use of a non-polar capacitor for the capacitor 70. However, currently available non-polar capacitors frequently are unsuitable for installation in the vehicle 10, for example, since the dimensions thereof are comparatively large.

Thus, according to the present embodiment, the damper 22 (the hydraulic mechanism 32) possesses a structure which reduces the possibility of harm to the durability of the capacitor 70, even if the capacitor 70 is a polar capacitor.

(A3-3-2. Detailed Content)

Even in the case that the capacitor 70 is a polar capacitor, according to the present embodiment, a configuration is used in which, in order to reduce the possibility of adversely affecting the durability of the capacitor 70, the level of power generation during forward rotation of the motor 66 differs from the level of power generation during reverse rotation of the motor 66.

As shown in FIG. 2, when the unsprung member 80 and the sprung member 82 approach one another, the piston head 42, which is included in the sprung member 82, comes in closer proximity to the unsprung member 80. At this time, the pressure applied to the piston head 42 mainly acts on a lower surface 90 thereof.

On the other hand, as shown in FIG. 3, when the unsprung member 80 and the sprung member 82 separate away from each other, the piston head 42, which is included in the sprung member 82, separates away from the unsprung member 80. At this time, the pressure applied to the piston head 42 mainly acts on an upper surface 92 thereof.

As made clear from FIGS. 2 and 3, according to the present embodiment, the piston rod 44 is fixed to the side of the vehicle body 26, and is included in the sprung member 82. Therefore, a surface area Aup of the upper surface 92 is smaller than a surface area Alow of the lower surface 90. Accordingly, the amount of change in the angle of rotation θ of the rotary shaft of the motor 66 or the equivalent gear ratio $\lambda\{=\theta/(x_2-x_1)\}$ thereof differs between a case where the unsprung member 80 and the sprung member 82 approach toward one another (FIG. 2), and a case where the unsprung member 80 and the sprung member 82 separate away from each other (FIG. 3). More specifically, the amount of change in the angle of rotation θ and the equivalent gear ratio λ become greater when the members 80, 82 approach toward one another than when the members separate away from each other.

Assuming that the equivalent gear ratio λ differs between approach and separation of the members 80, 82, it follows that the regenerative power of the motor 66 also differs between approach and separation of the members 80, 82. Therefore, the voltage of the capacitor 70 (hereinafter referred to as a "capacitor voltage Vc") becomes biased toward one polarity. Consequently, even if a polar capacitor is used as the capacitor 70, it is possible to reduce the possibility of damage to the durability of the capacitor 70.

(A3-3-3. Example of Voltage Change of Capacitor 70)

Figure 8:
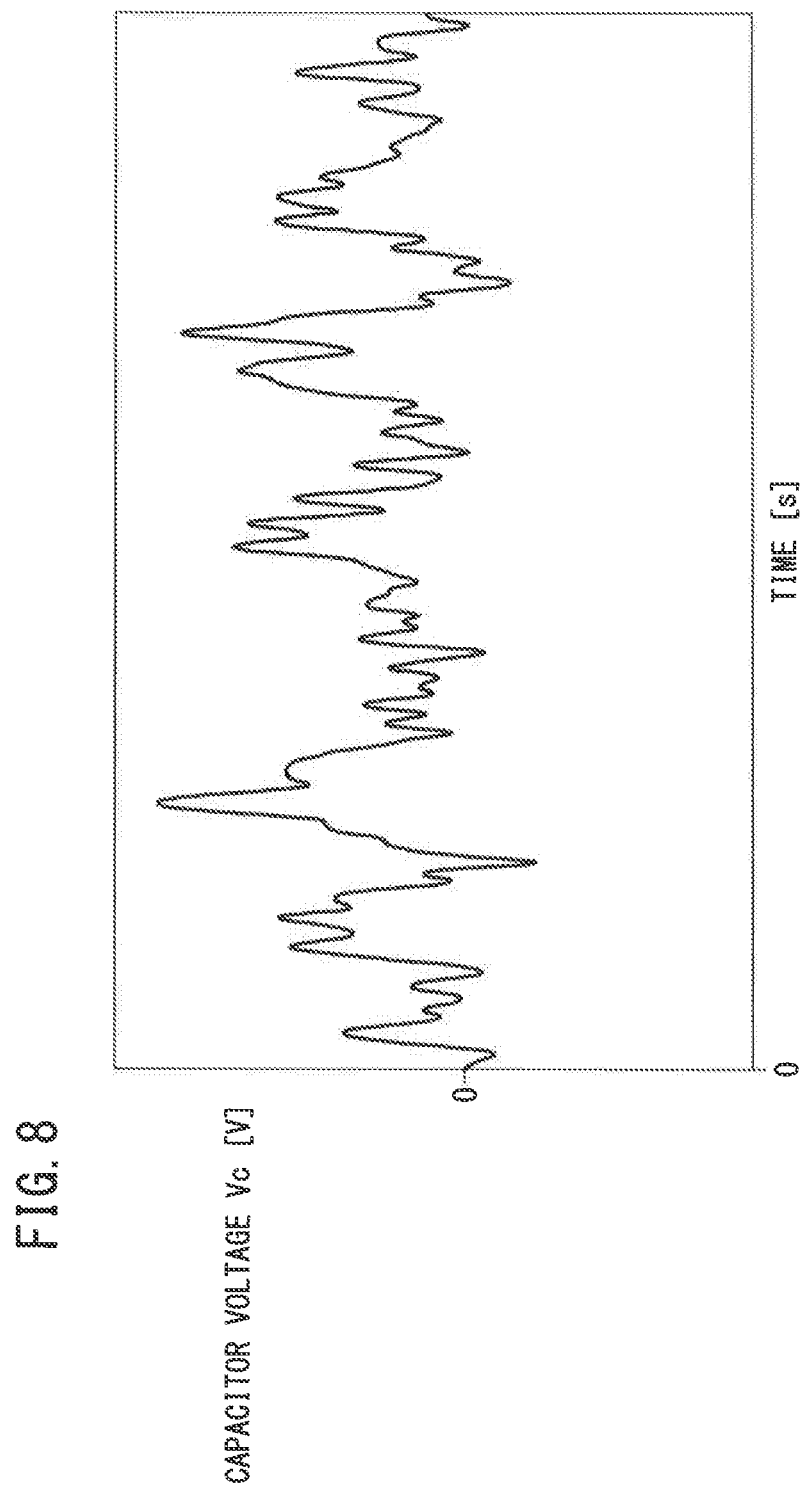
FIG. 8 is a time chart showing an example of changes in the voltage of the capacitor in the aforementioned embodiment.

FIG. 8 is a time chart showing an example of changes in the voltage (capacitor voltage Vc) of the capacitor 70 in the present embodiment. As can be understood from FIG. 8, the capacitor voltage Vc is biased (shifted) toward the positive side.

[A4. Advantages and Effects of the Present Embodiment]

In the foregoing manner, according to the present embodiment, the electric resonance frequency ωm, which is specified by the inductance L of the electromagnetic motor 66 and the capacitance C of the capacitor 70, is set to the unsprung mass resonance frequency ω1 or a value in the vicinity of the unsprung mass resonance frequency ω1 (see the first through third examples of FIGS. 5 through 7). In accordance with this feature, in addition to a component of the input vibration corresponding to the unsprung mass resonance frequency ω1, a component of the input vibration corresponding to the sprung mass resonance frequency ω2 is passively suppressed (see FIGS. 6 and 7). Consequently, without actively controlling the electromagnetic motor 66, it is possible to suppress components of input vibrations that correspond respectively to the unsprung mass resonance frequency ω1 and the sprung mass resonance frequency ω2.

More specifically, the inventor of the present invention has discovered that, if the electric resonance frequency ωm is set to the unsprung mass resonance frequency ω1 or a value in the vicinity thereof (for example, within ±20% from the unsprung mass resonance frequency ω1), in the force Fa that is generated in the damper main body 30 (actuator), an effect ("negative spring effect") is included in which components of input vibrations corresponding to the sprung mass resonance frequency ω2 are reduced. Therefore, in contradistinction to the invention disclosed in US 2004/0150361 A1, components of input vibrations corresponding respectively to the unsprung mass resonance frequency ω1 and the sprung mass resonance frequency ω2 can be suppressed, even without an active control by the electromagnetic motor 66 being performed in relation to input vibrations corresponding to the sprung mass resonance frequency ω2. Consequently, it is possible to improve energy utilization efficiency without consuming electric power in order to suppress components of input vibrations that correspond to the sprung mass resonance frequency ω2, but rather by storing electric power by regeneration of energy from the input vibrations.

Further, in the case that the capacitance C of the capacitor 70 is selected such that the electric resonance frequency ωm is set to the unsprung mass resonance frequency ωl or a value in the vicinity thereof, the above-described effects and advantages can easily be achieved by selecting the capacitor 70 according to the specifications of the electromagnetic motor 66.

B. Modifications

The present invention is not limited to the embodiment described above. On the basis of the disclosed content of the present specification, it is a matter of course that various modified or alternative configurations may be adopted therein. For example, the following configurations can be adopted.

[B1. Objects to which the Invention is Applied]

In the above-described embodiment, an example has been described in which the suspension device 12 or the damper 22 is applied to a vehicle 10 (see FIG. 1). However, for example, insofar as attention remains focused on using the polar capacitor 70 or the negative spring effect, the invention is not limited to this feature. For example, the suspension device 12 or the damper 22 can also be applied to other devices apart from vehicles (for example, ships, airplanes, elevators, measuring devices, or manufacturing devices).

[B2. Suspension Device 12]

(B2-1. Coil Spring 20)

In the above-described embodiment, the coil spring 20 is used as a spring for absorbing road surface vibrations (input vibrations) (see FIG. 1). However, for example, from the standpoint of absorbing road surface vibrations (input vibrations), other types of springs apart from coil springs (for example, flat springs) can also be used.

(B2-2. Damper 22)

In the above-described embodiment, the damper 22, which is equipped with the hydraulic mechanism 32, is used (see FIG. 1). However, for example, from the standpoint of the negative spring effect or the polar capacitor 70, the invention is not limited to this feature. For example, a configuration can be applied including a ball screw type, a rack and pinion type, or a direct type (linear motor) of damper or the like. Moreover, in the case of using the polar capacitor 70 in a damper 22 that is not equipped with the hydraulic mechanism 32, a configuration can also be used in which the equivalent gear ratio λ is changed between positive rotation and reverse rotation of the motor 66 (for example, a configuration in which a one-way clutch is arranged on the rotary shaft of the motor 66 or on another rotating shaft connected thereto).

According to the above-described embodiment, the piston rod 44 is disposed on the side of the vehicle body 26 (see FIG. 1, etc.). However, for example, from the standpoint of the negative spring effect or the polar capacitor 70, the invention is not limited to this feature, and the piston rod 44 can also be arranged on the side of the wheels 24.

(B2-3. Hydraulic Mechanism 32)

In the above-described embodiment, the damping force Fd by the motor 66 is transmitted via oil (see FIGS. 2 and 3). However, for example, from the standpoint of transmitting the damping force Fd by the motor 66, it is possible to use a fluid other than oil (for example, air).

(B2-4. Electromagnetic Motor 66)

According to the above-described embodiment, the electromagnetic motor 66 is a DC type of motor. However, for example, from the standpoint of controlling the negative spring effect or the polar capacitor 70, the invention is not limited to this feature. For example, an AC type of motor may be used for the motor 66.

FIG. 9 is a cross-sectional view showing in simplified form a configuration of an electromagnetic motor 66a (hereinafter also referred to as a "motor 66a") according to a modification. The motor 66a is a commutator type single-phase AC motor. As shown in FIG. 9, the motor 66a is equipped with a rotor 240 and a stator 242. A commutator 246 that is formed on a rotary shaft 244 of the rotor 240 is placed in contact with a brush 248 of the stator 242. According to the present modification, the commutator 246 and the brush 248 are constituted in the form of slip rings.

In the case of using the commutator type single-phase AC motor 66a as shown in FIG. 9, the following effects are obtained. More specifically, compared to a general DC motor having an iron core in the rotor 240, the commutator type single-phase AC motor 66a can significantly reduce the moment of inertia. Consequently, if the damper 22 equipped with the motor 66a of FIG. 9 is used, for example, in the suspension device 12 for the vehicle 10, it is possible to prevent worsening of comfort during riding when high frequency road surface vibrations occur.

(B2-5. Capacitor 70)

According to the above-described embodiment, the capacitance C of the capacitor 70 is selected such that the electric resonance frequency ωm, which is specified by the inductance L of the electromagnetic motor 66 and the capacitance C of the capacitor 70, is set within ±20% from the unsprung mass resonance frequency ω1. However, for example, from the standpoint of the negative spring effect or the polar capacitor 70, the invention is not limited to this feature. For example, by providing another inductance separately from the inductance L of the motor 66, it also is possible for the electric resonance frequency ωm to be set within ±20% from the unsprung mass resonance frequency ω1.

In the above-described embodiment, the capacitor 70 is a polar capacitor. However, for example, from the standpoint of utility of the damper 22 or the negative spring effect, a non-polar capacitor can also be used as the capacitor 70.

(B2-6. Battery 72)

According to the above-described embodiment, the battery 72 is connected to the capacitor 70, and the battery 72 is charged with electrical power of the capacitor 70 (see FIG. 1). However, for example, from the standpoint of the polar capacitor 70 or the negative spring effect, the invention is not limited to this feature. For example, instead of the battery 72, other electrical devices (for example, audio equipment, a navigation device, a display device of an instrument panel, etc.) may be connected to the capacitor 70. Alternatively, it is possible for the battery 72 to be dispensed with.

[B3. Negative Spring Effect]

According to the above embodiment, the electric resonance frequency ωm and the like are set in consideration of the negative spring effect. However, for example, from the standpoint of utilizing the polar capacitor 70, the invention is not limited to this feature. For example, the polar capacitor 70 can be applied to a configuration in which the electric resonance frequency ωm is set to coincide with the sprung mass resonance frequency ω2 or a frequency in the vicinity thereof. Alternatively, the polar capacitor 70 may be used for the purpose of utilizing the LC resonance, as in US 2004/0150361 A1, for damping the unsprung mass resonance frequency ω1 or a range surrounding the unsprung mass resonance frequency ω1.

The invention claimed is:

1. A damper comprising:
   a damper main body arranged in parallel with a spring configured to absorb vibrations input from a road surface to a wheel, the spring being disposed between a vehicle body and a spring seat, the damper main body equipped with a piston head connected to the vehicle body, and a hydraulic cylinder internally partitioned into a first hydraulic chamber and a second hydraulic chamber by the piston head;
   an electromagnetic motor configured to generate a damping force with respect to the spring by regenerating energy from an input vibration input to the damper main body; and
   a capacitor connected electrically with the electromagnetic motor,
   wherein the first hydraulic chamber is connected to one port of a hydraulic pump through a first oil flow passage, the second hydraulic chamber is connected to another port of the hydraulic pump through a second oil flow passage, and a rotary shaft of the hydraulic pump is connected to a rotary shaft of the electromagnetic motor;
   and wherein an electric resonance frequency, which is specified by an inductance of the electromagnetic motor and a capacitance of the capacitor, is set within ±20% from an unsprung mass resonance frequency, so that, in addition to a component of the input vibration corresponding to the unsprung mass resonance frequency, a component of the input vibration corresponding to a sprung mass resonance frequency is passively suppressed.

2. The damper according to claim 1, wherein the electric resonance frequency is set to a value equal to the unsprung mass resonance frequency.

3. The damper according to claim 1, wherein the electromagnetic motor is a commutator type single phase AC motor.

4. A manufacturing method for a damper, the damper being equipped with a damper main body arranged in parallel with a spring configured to absorb vibrations input from a road surface to a wheel, the spring being disposed between a vehicle body and a spring seat, the damper main body equipped with a piston head connected to the vehicle body, and a hydraulic cylinder internally partitioned into a first hydraulic chamber and a second hydraulic chamber by the piston head, an electromagnetic motor configured to generate a damping force with respect to the spring by regenerating energy from an input vibration input to the damper main body, and a capacitor connected electrically with the electromagnetic motor,
   wherein the first hydraulic chamber is connected to one port of a hydraulic pump through a first oil flow passage, the second hydraulic chamber is connected to another port of the hydraulic pump through a second oil flow passage, and a rotary shaft of the hydraulic pump is connected to a rotary shaft of the electromagnetic motor,
   the manufacturing method comprising the step of:
   selecting a capacitance of the capacitor so that an electric resonance frequency, which is specified by an inductance of the electromagnetic motor and the capacitance of the capacitor, lies within ±20% from an unsprung mass resonance frequency, so as to passively suppress a component of the input vibration corresponding to a sprung mass resonance frequency, in addition to a component of the input vibration corresponding to the unsprung mass resonance frequency.

* * * * *